(12) United States Patent
Fontaine

(10) Patent No.: US 8,439,289 B2
(45) Date of Patent: May 14, 2013

(54) CHEESE SHREDDING APPARATUS

(76) Inventor: Steeve Fontaine, St-Fereol-les-Neiges (CA)

( * ) Notice: Subject to any disclaimer, the term of this patent is extended or adjusted under 35 U.S.C. 154(b) by 631 days.

(21) Appl. No.: 12/772,149

(22) Filed: Apr. 30, 2010

(65) Prior Publication Data
US 2010/0294140 A1    Nov. 25, 2010

(30) Foreign Application Priority Data

May 22, 2009  (GB) ................ GB0908895.6

(51) Int. Cl.
*B02C 1/00*    (2006.01)

(52) U.S. Cl.
USPC .......................... 241/282; 241/94; 241/283

(58) Field of Classification Search .......... 241/94, 241/273.2, 280, 282, 283; 30/346, 351; 83/613, 83/618, 620, 932
See application file for complete search history.

(56) References Cited

U.S. PATENT DOCUMENTS

| | | | | |
|---|---|---|---|---|
| 28,419 A | * | 5/1860 | Trissler | 241/283 |
| 1,445,787 A | * | 2/1923 | Meyers | 83/613 |
| 1,656,415 A | * | 1/1928 | Breitkrentz | 83/620 |
| 1,668,286 A | * | 5/1928 | Powell | 83/425.1 |
| 3,831,866 A | * | 8/1974 | Phillips | 241/63 |
| 6,415,711 B1 | * | 7/2002 | Penta | 99/465 |

* cited by examiner

*Primary Examiner* — Dana Ross
*Assistant Examiner* — Leonel Vasquez

(57) ABSTRACT

A cheese shredding apparatus has a table top with a rolling platform that uses 2 pairs of beveled wheels. A partitioned hopper for containing blocks of cheese. A pair of cutting grids located at opposite ends of a cutting block. A pair of push cube modules. A motor powers the rolling platform by way of a cam which converts a rotational motion from the motor into a linear motion which actuates the back and fro motion of the rolling platform.

The beveled wheels roll on a pair of tracks which are held within the table top frame. The beveled wheels maintain a very precise and accurate tracking motion of the rolling platform as they move back and forth as guided by the tracks.

10 Claims, 5 Drawing Sheets

CHEESE SHREDDING APPARATUS

This application claims priority based on request GB0908895.6 filed May 22, 2009

FIELD OF THE INVENTION

The present invention relates generally to food preparation devices but more particularly to a machine that shreds blocks of cheese into small chunks.

BACKGROUND OF THE INVENTION

There exist a number of devices used in shredding cheese but they tend to wear out fast. The blades need to be sharpened frequently. Moreover, the blades sometimes leave black marks on the cheese. Also, they are hard or complicated to dismantle so as to be thoroughly cleaned. Cleanliness is of paramount importance in the food industry and any device that is hard to be kept clean can be hazardous.

SUMMARY OF THE INVENTION

In view of the foregoing disadvantages inherent in the known devices now present in the prior art, the present invention, which will be described subsequently in greater detail, is to provide objects and advantages which are:

To provide for a machine that is easy to dismantle so as to be thoroughly cleaned. Uses a unique set of wheels that reduces wear. Has a cutting means which does not leave black marks on the cheese.

To attain these ends, the present invention generally comprises a cheese shredding apparatus having a support table with a plurality of support legs and a table top. The table top including a frame, a pair of tracks attached to the frame, a rolling platform having a plurality of wheels adapted to roll upon the tracks, a cutting block secured upon the rolling platform and including at least one cutting grid on a side thereof; a hopper member secured to a top portion of the table top and positioned and adapted such that cheese may be transferred through the hopper member and contact the cutting block and rolling platform. At least one push cube module attached to a bottom side of the hopper member and adapted to interact with the at least one cutting grid. A motor member attached to the support table below the table top and mechanically connected to the rolling platform to thereby provide linear back and forth motion thereto, such that when the rolling platform is moving back and forth and the cheese is transferred through the hopper member and contacts the at least one cutting grid of the cutting block, the cheese is cut and forced within empty portions of the at least one cutting grid until the cutting grid comes in contact with the at least one push cube module, wherein the cheese is pushed out from the portions of the at least one cutting grid by the at least one push cube module and collected, and wherein these motions are repeated over and over by the motor member until the motor is turned off.

The wheels are beveled, and the tracks are formed in a shape similar to the beveled shape of the wheels, such that the beveled wheels fit snugly upon and move precisely along the shape and path of the tracks.

The hopper member includes a partition member, to thereby partition the hopper into two partitions.

The rolling platform has a cutting block having two cutting grids placed on opposite sides thereof, and the hopper member has two push cube modules placed on opposite sides thereof and positioned such that each push cube module interacts precisely with a respective cutting block cutting grid.

A cam member is connected between the motor and the rolling platform to thereby convert rotating motion from the motor into linear motion for moving the rolling platform back and forth within the tracks of the table top.

The support legs of the support table each have a wheel member at the bottom thereof, such that the cheese shredding apparatus can be easily moved and transported.

The support legs, table top, hopper member, and motor member are easily detachable from one another, such that the cheese shredding apparatus is adapted to be easily dismantled, transported, and reconnected.

Cover members adapted to cover the at least one push cube module; a cover member adapted to cover the motor; and the covers are removably connected by removable wing nuts.

The support legs, table top, and hopper member are formed from a material chosen from a list of materials that includes stainless steel, aluminum, composites, and plastic.

The cutting block is formed from a material chosen from a list of materials that includes stainless steel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION OF THE PREFERRED EMBODIMENT

Figure 1:
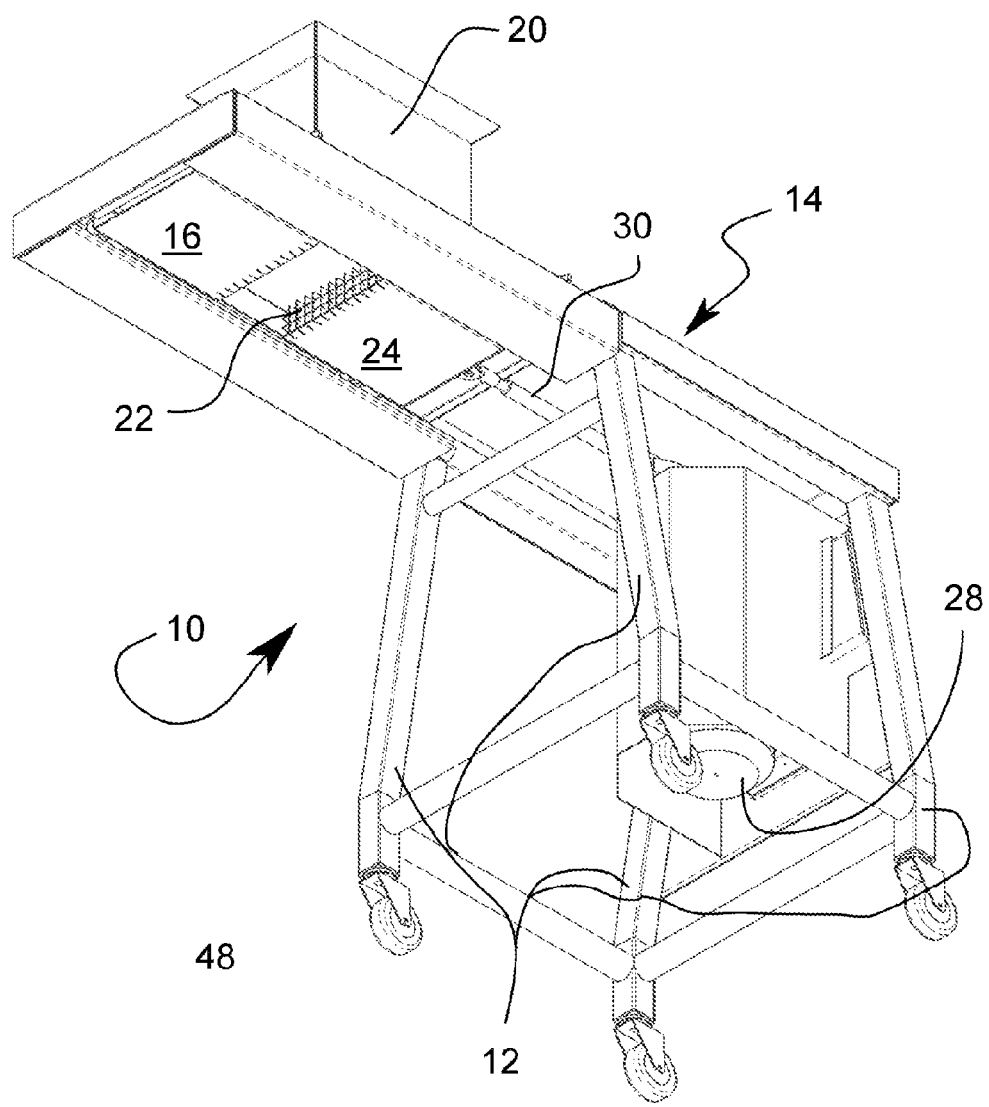
FIG. 1 Perspective low angle view of the invention. Part of the rolling platform is removed to show the two cutting grids of the cutting block.
Figure 2:
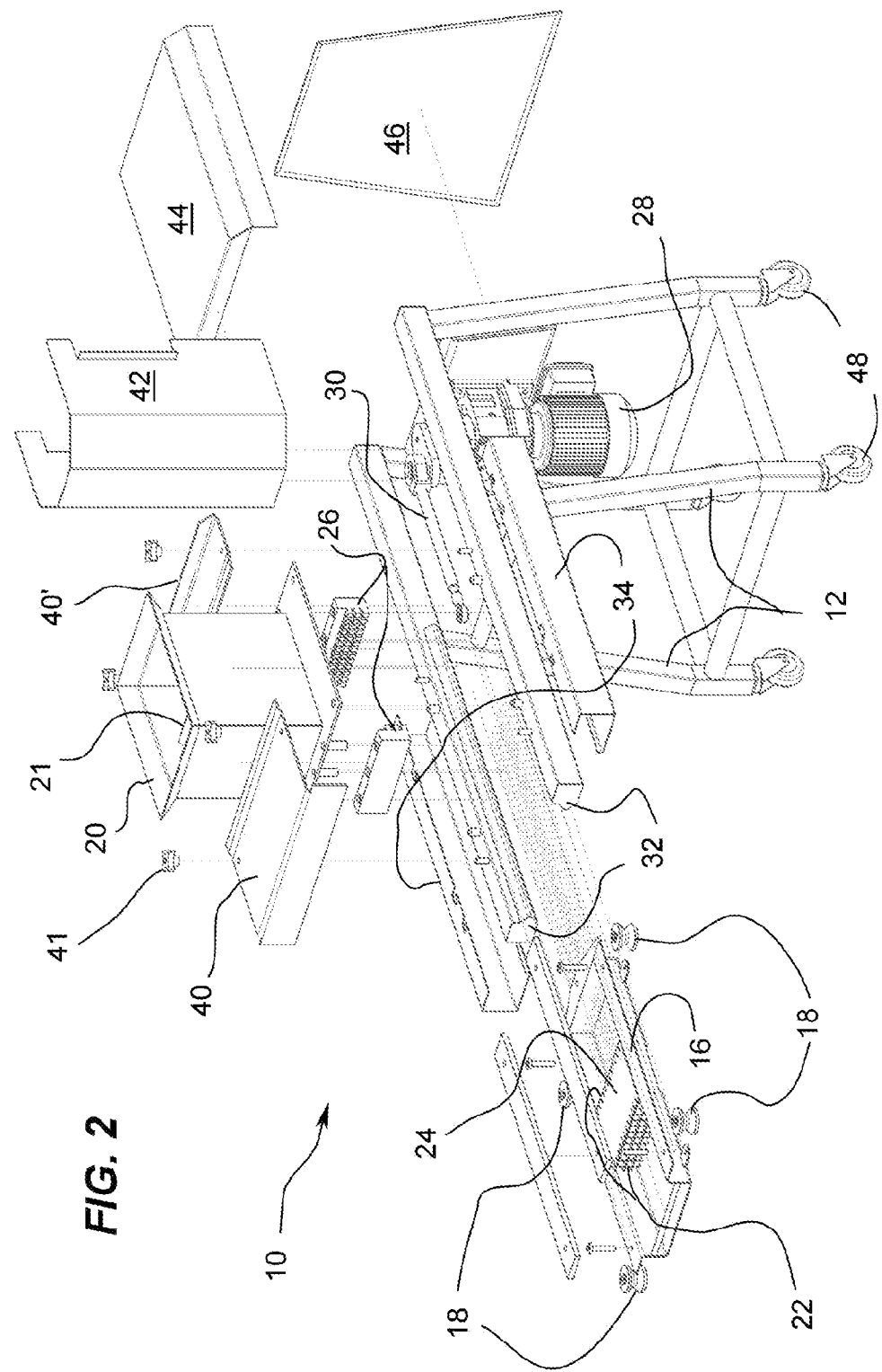
FIG. 2 Exploded view of the invention.
Figure 3A:
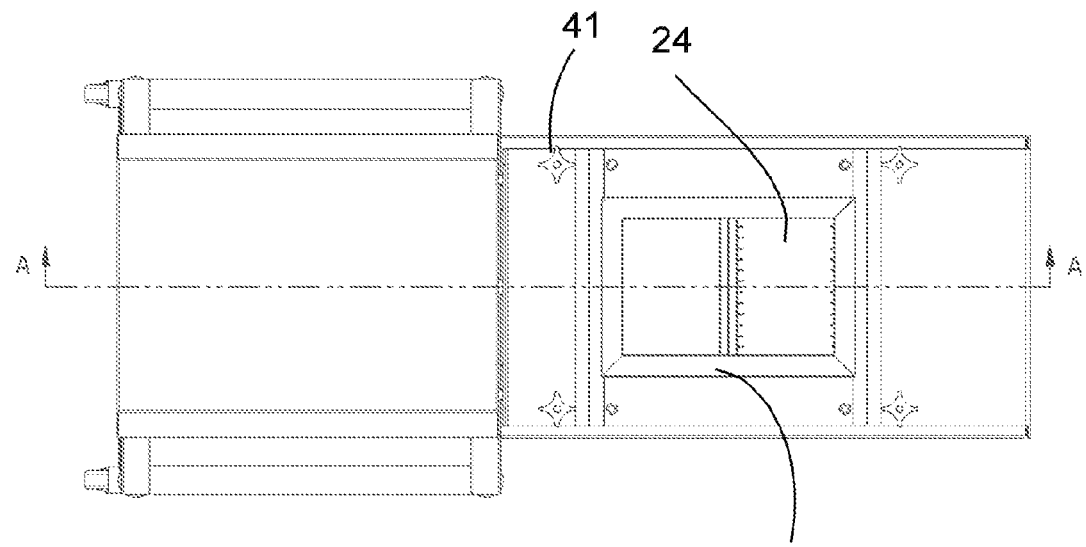
FIG. 3a-b Top and side cutaway view, respectively, of the invention.
Figure 3B:
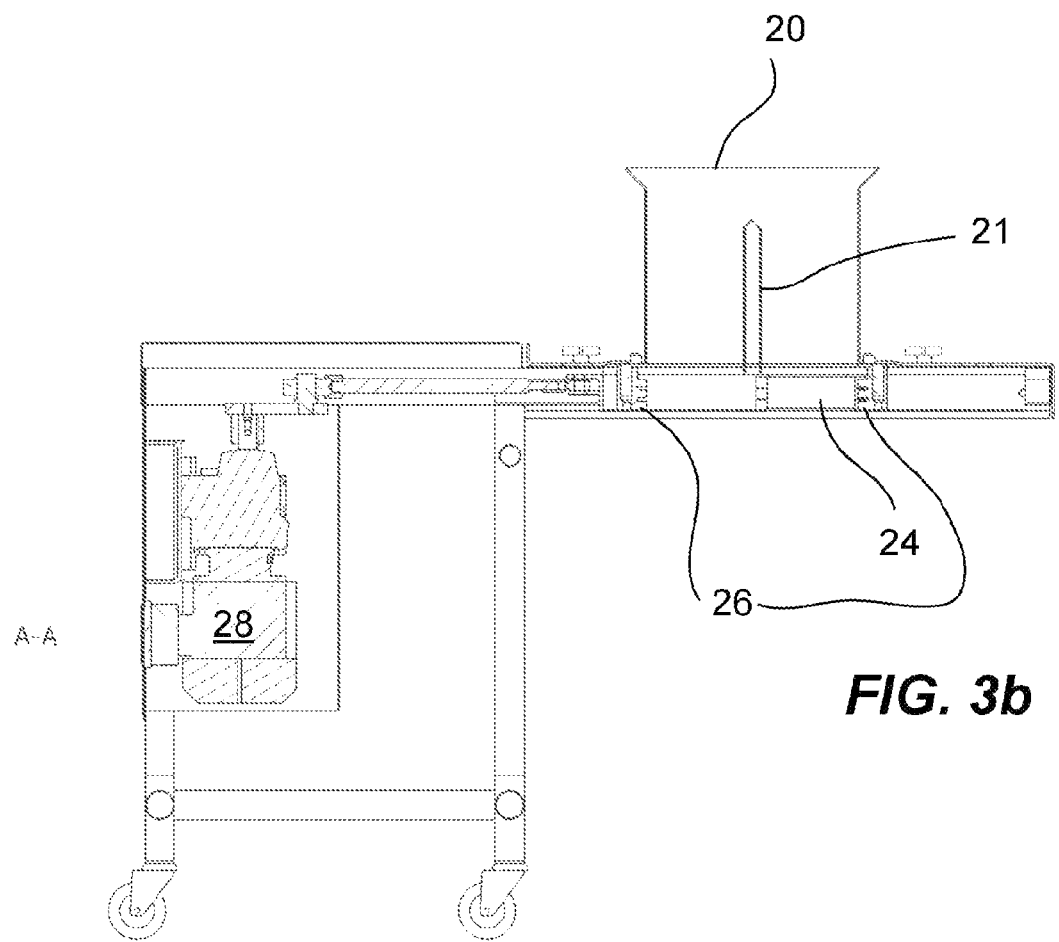
Figure 4D:
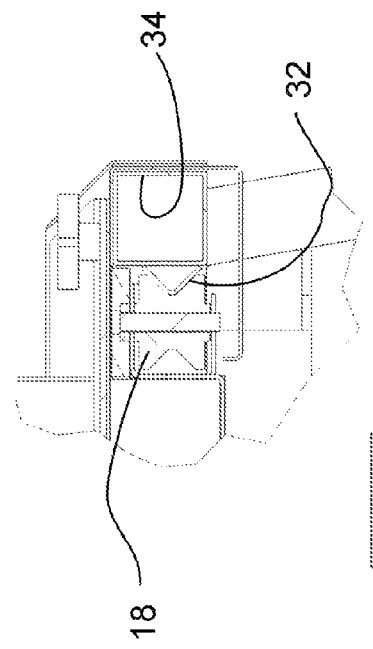
FIGS. 4c-d End view and beveled wheel detail, respectively.
Figure 4A:
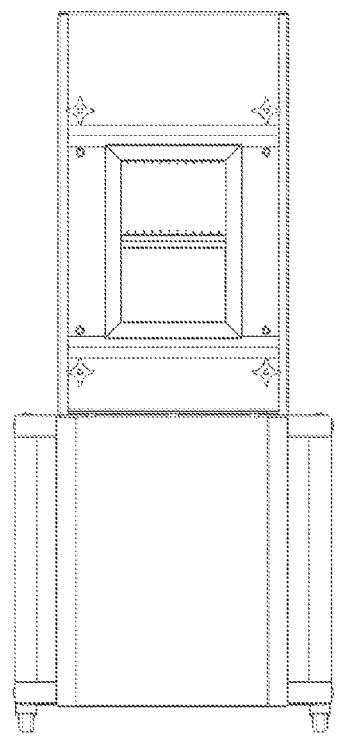
FIGS. 4a-b Top and alternate side cutaway view, respectively, of the invention.
Figure 4C:
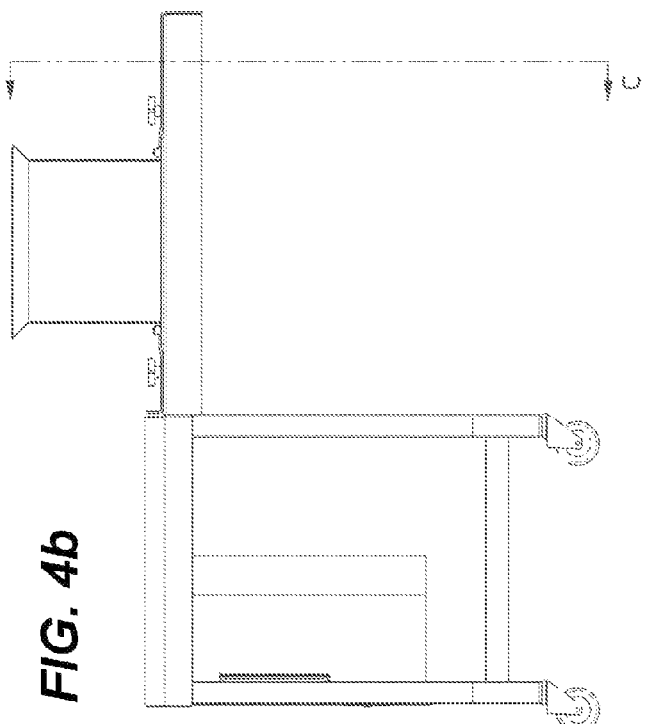
Figure 4B:
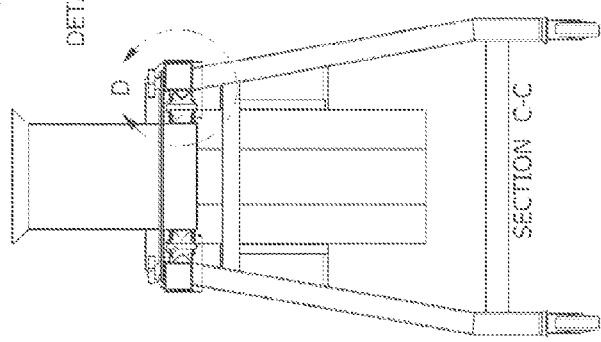

A cheese shredding apparatus (10) has a support table top (14) having a plurality of support legs (12).

The table top (14) includes a rolling platform (16) that uses 2 pairs of beveled wheels (18). A partitioned hopper (20), so named because it has a partition (21), contains blocks of cheese (not shown) to be chopped. A pair of cutting grids (22) located at opposite ends of a cutting block (24) and a pair of push cube modules (26) cooperate in the process of chopping the cheese and then pushing it out of the cutting grids (22). The cutting block (24) has one set of blades (25) at opposite ends a top (27) and two sides (29).

A motor (28) powers the rolling platform (16) by way of a cam (30) which converts a rotational motion from the motor (28) into a linear motion which actuates the back and forth motion of the rolling platform (16).

Figure 5A:
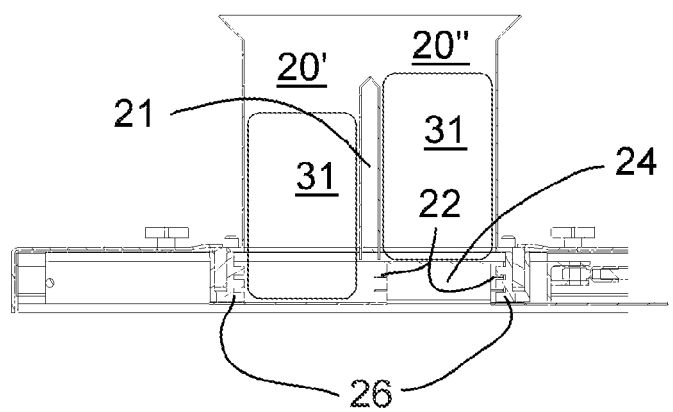
FIGS. 5a-b Side cutaway views showing the two positions of the cutting block.
Figure 5B:
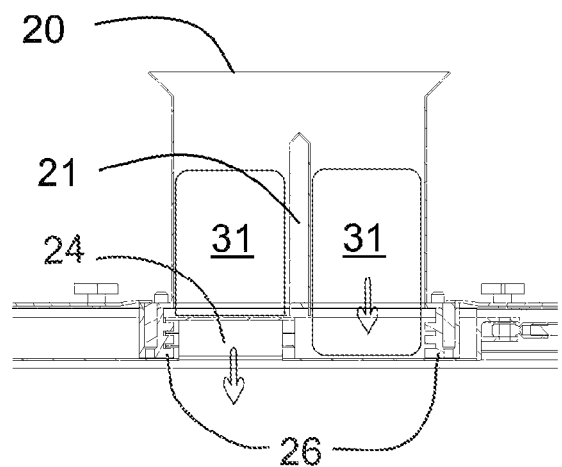

As can be seen in FIG. 5a, a block of cheese (31) located inside a first partition (20') has dropped down onto the rolling platform (16) so that it is in line with the cutting grid (22), as the cutting grid (22) moves, in this case to the left, as seen in FIG. 5b, a piece of the cheese (31) in the first partition (20') is being cut and the cut part drops down into a container (not shown) or a conveyor belt (not shown). The cheese (31) in partition (20'), as seen in FIG. 5b now rests atop the cutting block (24) while the cheese (31) in a second partition (20") now drops onto the rolling platform (16), ready to be cut by the return of the cutting block (24) towards the right.

The beveled wheels (18) roll on a pair of tracks (32) which are held within the table top frame (34).

A problem of the cheese shredders and cutters of the prior art is that they tend to create a black smudge on the cheese. The black color comes from a chemical reaction between the lactoserum in the cheese and the stainless steel blade. This phenomenon occurs when there is a strong pressure between the cheese and the blade, which extracts the lactoserum from the cheese. In order to avoid that, this present invention makes use of its beveled wheels (18), cutting block (24), push cube modules (26) and its rolling platform (16) which cooperate together to reduce the pressure applied to the cheese at the moment it makes contact with the stainless steel of the cutting block (24).

The beveled wheels (18) are not subject to as much wear as ordinary wheels and as such, maintain a very precise and accurate tracking motion of the rolling platform (16) as they move back and forth as guided by the tracks (32). This ensures very precise and accurate alignment with the cutting block (24) and push cube modules (26). The fact that the adjustments are precise means that no cheese fragment will escape the area of the cutting (24) and push cube modules (26) so as to wander onto the tracks (32) and interfere with the beveled wheels (18). This is a problem that is often encountered in cheese shredders of the prior art and which makes them hard to clean and unhygienic, amongst other drawbacks.

The cheese shredding apparatus has a method of operation consisting in the steps of: a first block of cheese located inside a first partition drops onto the rolling platform so that it is in line with the cutting grid. As the cutting grid moves, in one direction a piece of the first block of cheese inside the first partition is being cut and the cut part drops down for further processing. As the first block of cheese rests atop the cutting block, a second block of cheese located in a second partition of the hopper drops onto the rolling platform to be cut by the return of the cutting block in an opposite direction.

Other parts are mostly cover plates such as push cube module covers (40, 40'), held by wing nuts (41); motor cover (42); a motor housing top cover (44); and a motor housing rear cover (46). Also, the cheese shredding apparatus (10) has support legs (12) which can optionally have wheels (48).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A cheese shredding apparatus comprising a support table having a plurality of support legs and a table top;

said table top including a frame, a pair of tracks attached to said frame, a rolling platform having a plurality of wheels adapted to roll upon said tracks, a cutting block secured upon the rolling platform and including at least one cutting grid on a side thereof; a hopper member secured to a top portion of said table top and positioned and adapted such that cheese may be transferred through said hopper member and contact said cutting block and rolling platform;

at least one push cube module attached to a bottom side of said hopper and adapted to interact with said at least one cutting grid;

and a motor member attached to said support table below said table top and mechanically connected to said rolling platform to thereby provide linear back and forth motion thereto, such that when said rolling platform is moving back and forth and said cheese is transferred through said hopper member and contacts said at least one cutting grid of said cutting block, said cheese is cut and forced within empty portions of said at least one cutting grid until said cutting grid comes in contact with said at least one push cube module, wherein said cheese is pushed out from said portions of said at least one cutting grid by said at least one push cube module and collected, and wherein these motions are repeated over and over by said motor member until the motor is turned off.

2. The cheese shredding apparatus of claim 1, wherein said wheels are beveled, and said tracks are formed in a shape similar to the beveled shape of said wheels, such that said beveled wheels fit snugly upon and move precisely along the shape and path of said tracks.

3. The cheese shredding apparatus of claim 1, wherein said hopper member includes a partition member, to thereby partition the hopper into two partitions.

4. The cheese shredding apparatus of claim 1, wherein said rolling platform has a cutting block having two cutting grids placed on opposite sides thereof, and said hopper member has two push cube modules placed on opposite sides thereof and positioned such that each push cube module interacts precisely with a respective cutting block cutting grid.

5. The cheese shredding apparatus of claim 1, wherein a cam member is connected between said motor and said rolling platform to thereby convert rotating motion from said motor into linear motion for moving said rolling platform back and forth within said tracks of said table top.

6. The cheese shredding apparatus of claim 1, wherein said support legs of said support table each have a wheel member at the bottom thereof, such that said cheese shredding apparatus can be easily moved and transported.

7. The cheese shredding apparatus of claim 1, wherein said support legs, table top, hopper member, and motor member are easily detachable from one another, such that the cheese shredding apparatus is adapted to be easily dismantled, transported, and reconnected.

8. The cheese shredding apparatus of claim 1, further comprising cover members adapted to cover said at least one push cube module;
   a cover member adapted to cover said motor; and wherein said covers are removably connected by removable wing nuts.

9. The cheese shredding apparatus of claim 1, wherein said support legs, table top, and hopper member are formed from a material chosen from a list of materials that includes stainless steel, aluminum, composites, and plastic.

10. The cheese shredding apparatus of claim 1, wherein said cutting block is formed from a material chosen from a list of materials that includes stainless steel.

* * * * *